Dec. 28, 1937.   F. S. DE DEZA ET AL   2,103,321
APPARATUS FOR PRODUCING OPTICAL ILLUSIONS
Filed April 24, 1937

INVENTOR
FRANCISCO SUAREZ DE DECA
RAYMOND BENITO MANGANA TRABAZO
BY
ATTORNEYS

Patented Dec. 28, 1937

2,103,321

UNITED STATES PATENT OFFICE 2,103,321

APPARATUS FOR PRODUCING OPTICAL ILLUSIONS

Francisco Suárez de Deza and Ramón Benito Mangana Trabazo, Buenos Aires, Argentina Application April 24, 1937, Serial No. 138,786 In Argentina February 23, 1937

3 Claims. (Cl. 88—75)

This invention relates to an apparatus which in the daytime or at night, that is to say, when placed in a very illuminated, little illuminated or dark spot, produces the illusion of transporting the objects, transforming one object into another and making them appear and disappear, said apparatus being capable of producing these three phenomena individually, any two of them at a time or all of them simultaneously, based on the combination of a transparent mirror and a light filter, as will be explained later, to which an alternating illumination system is applied.

The light filter is a transparent but not diaphanous body, which allows the exact shape of the objects to be seen through same, but only lets part of the light pass therethrough. It may consist, for example, of a somewhat smoke-colored crystal, a transparent mirror operated by transparency, colored celluloid or glass, preferably gray-colored, which should naturally be transparent, or any other material having these conditions. Transparent crystal or glass without color or gray shade are not considered here as light filters, as they allow almost the entirety of the light to pass through.

In order that the invention may be more clearly understood, same has been illustrated by way of example in the accompanying drawing, wherein:—

Figure 1:
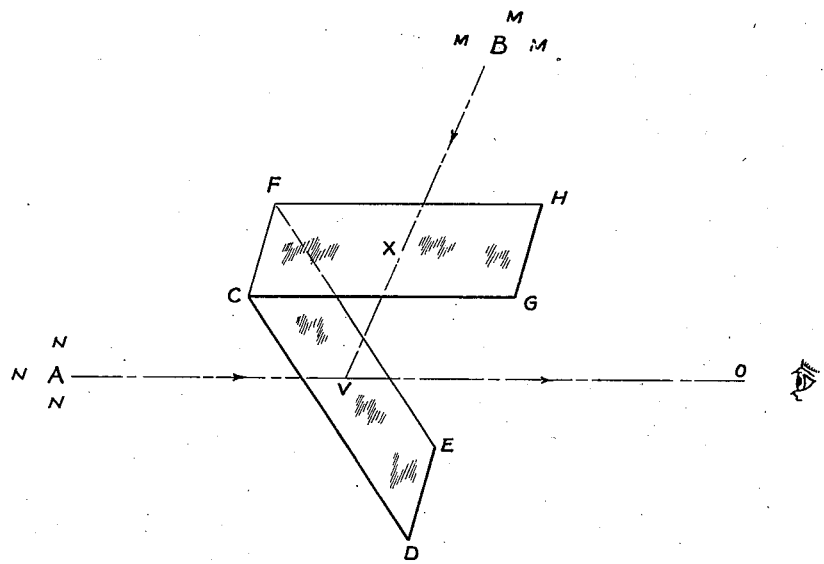

Figure 1 shows the transparent mirror CDEF and the light filter CGHF, the space A where the objects N are placed, the space B where the objects M are arranged, and the space O where the observers are located. The transparent mirror and the light filter are placed in such a position that when the luminous rays come from the space A they pass through the mirror CDEF and reach the observers, that is to say, they follow the path AVO; and when the luminous rays come from the space B they pass through the light filter CGHF, reflect on the mirror CDEF and are directed to the observers, thereby following the path BXVO. It is convenient that the visible parts of the space A be symmetrical with the visible parts of the space B in respect to the mirror CDEF. Objects may also be placed on the zone comprised between the space A and the transparent mirror CDEF.

Having explained the position of the transparent mirror, the light filter and the objects, we will now describe the construction in detail.

Figure 2:
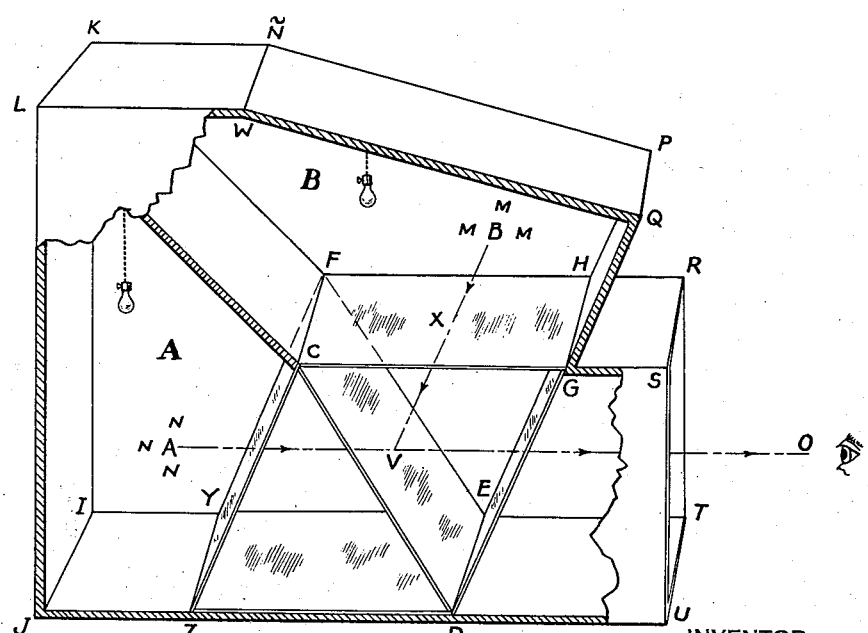

The construction of the apparatus, the details of which are only given by way of example, may be as explained hereunder with reference to Figure 2. The same reference characters indicate like or corresponding parts in both Figures 1 and 2.

CDEF is the transparent mirror, and CGHF the light filter. The space B where the objects M are placed, is limited by the faces PQGH, QPÑW, ÑWLK, KLCF, FCGH, LCGQW and KFHPÑ. We draw in Figure 2 the straight line CZ, symmetrical with CG in respect to the mirror CDEF, the straight line FY, symmetrical with FH in respect to the same mirror, and join Y to Z. The space A, where the objects N are placed, is limited by the bottom IJZY and its faces JIKL, KLCF, FCZY, LJZC and KIYF. The face FCZY mentioned above is not a wall, but only a geometrical idea of the plane limiting the space A, as if same were an opaque wall it would prevent the vision of the objects N; it is merely a glass, crystal, etc. or same may be omitted. Objects may also be placed on the space CDZFEY. An opaque screen LCFK, which need not necessarily be flat, is placed between the spaces A and B. It is convenient to make the visible faces of the space A symmetrical with the visible faces of the space B in respect to the transparent mirror CDEF, viz: IJZY symmetrical with PQGH, and the visible part of JIKL, which is its lower part, symmetrical with QPÑW. It is only necessary that these latter faces, as also those mentioned below, be symmetrical in their visible portions, and as the parts near L and K and the straight lines LC and KF are not visible, it is not necessary that they be symmetrical. The visible part of the face LJZC will be symmetrical with the visible part of LWQGC (to obtain which it is sufficient that ZC be symmetrical with GC; JZ with QG, and the lower part of LJ symmetrical with WQ), and the visible part of KIYF will be symmetrical with the visible part of KÑPHF (for which purpose YF will be symmetrical with HF, IY with PH, and the lower part of KI will be symmetrical with ÑP). Also, the objects N should be placed as near as possible to the symmetrical positions of the objects M in respect to the plane of the transparent mirror CDEF. The transparent mirror and the light filter may form a 57° angle, and the light filter CGHF may be parallel to the bottom IJUT of the apparatus, and very good results are obtained with this position. A crystal or glass rests upon the part YZDE of the bottom of the apparatus. Symmetrically with this crystal or glass in relation to CDEF, a further glass or crystal is placed at HGDE. Preferably, the internal surfaces CZUS, FYTR, HGSR and EDUT are painted black or any other dark color. Also, those external parts of the apparatus which are to directly receive sunlight are preferably painted black or any other dark color.

Should it be desired to place the objects N or M in a space other than the spaces A and B mentioned, it would be necessary to provide a mirror to reflect them, the image of said objects appearing on the space A or B of the apparatus. The space A may be made wider than the opening SRTU, viz; for example JI larger than UT, provided that the space B is equal to A in width, to maintain the visible parts of A and B symmetrical. Objects or live beings may be placed in the spaces A, B and CDZFEY; also, like objects may be placed in A and B as well as persons, to produce the illusion of transforming one person into another, etc.

The apparatus carries a system which periodically changes the illumination from A to B and from B to A, obtained for example by placing lights in A and B symmetrically located in relation to the mirror CDEF, said lights giving direct or indirect illumination. A suitable device, electrical or not, will periodically put on some of the lights at the same time it puts out the others.

The operation of the apparatus of the present invention is as follows:—

By means of any of the lighting devices mentioned above, the spaces A and B are alternatively illuminated in the following manner: during a certain length of time the space B is dark and the space A illuminated; then the lights in A are put out at the same moment B is illuminated, only the space B remaining thereby illuminated; then the lights in B are put out at the same moment A is illuminated, and so on. Upon the space A, and consequently the objects N, being illuminated, the luminous rays pass through the transparent mirror CDEF following the path AVO and reach the observer, who sees said objects perfectly clear. It is understood that not all the luminous rays reaching the transparent mirror CDEF pass through same, as some of them will reflect back to the space A; but as these latter rays do not reach the observer we will disregard same in our explanation, as well as the rays which leaving from B do not reach the observer.

When the lights of A are put out, and B is illuminated and consequently also the objects M, the luminous rays pass through the light filter CGHF, reflect on the mirror CDEF following the path BXVO and reach the observers. The observers see the objects M, but as they see them by reflection, same appear as if located where their images are, viz; symmetrical in relation to the mirror CDEF, or in the space A, exactly where the objects N were seen before, thereby producing the illusion of transforming one object into another. Therefore, the image of the visible parts of space B should preferably coincide with the visible parts of space A, so that no change can be noticed in the bottom, background and walls, and in order to obtain this, said parts of space B should be symmetrical with the corresponding parts of A in relation to the mirror CDEF; also the places occupied by the objects N and M should be as nearly symmetrical as possible. In this manner, the illusion of transformation is obtained.

If no objects are placed in the space A, on illuminating B the objects M will be shown, and when the lights in B are put out and A is illuminated, no objects can be seen, thereby producing the invisibility of the objects M. Naturally, the objects will successively appear and disappear with each change of lights. In a similar manner, by placing the objects N in the space A and leaving the space B blank, upon putting out the lights in A and illuminating B, the invisibility of the objects N is obtained.

By placing objects in the spaces A, B and CDZFEY, upon illuminating A, and therefore also the space CDZFEY, the objects in these two latter spaces will appear, and same will disappear on putting out the lights of A and CDZFEY and illuminating B, whereupon the objects M will be seen. This change may be considered as a transformation, but also as the transformation of the objects N of A into those objects M of B, and at the same time the invisibility of the objects in space CDZFEY, as the latter will show no image. The illusion of transformation and invisibility is therefore obtained.

If objects are placed in spaces A and CDZFEY but not in B, the invisibility of such objects will be produced upon putting out the lights in A and CDZFEY and illuminating B.

If the objects are only placed in the space CDZFEY, they will be invisible when there is no light in said space.

By arranging like objects in B and in CDZFEY, the illusion of transportation will be produced upon changing the lights.

When like objects are placed in CDZFEY and in B, and different objects in A, the invisibility and illusion of transportation are obtained.

By placing like objects in B and in CDZFEY, and also other objects in A and B, different from each other and different from the former, the illusion of transportation and transformation is obtained.

When like objects are placed in the spaces B and CDZFEY, and also other objects different from each other are placed in said spaces and in A, the three effects will be simultaneously obtained: the illusions of transportation, transformation and invisibility.

The light filter CGHF is necessary, as by omitting same the objects M would always be more or less illuminated by the light coming from the part O. Said light, following the path OV, would reflect on the mirror CDEF (regardless of whether or not A is illuminated) and pass to B, illuminating the objects M, which would always be seen. Therefore, upon A being illuminated and the lights of B being put out, the objects M would be more or less illuminated by the light coming from O, and the objects N by the light from A. Therefore, the objects N and M will be seen superposed, producing an undesirable effect, since for a certain period only the objects M will be seen; later, the objects N and M will be seen superposed, then again the objects M, and so on, without the objects N being visible by themselves. This detrimental effect of the objects M being persistingly seen is very intensely produced in the daytime, due to the amount of light entering in the direction OV and VB, or even at night, when the apparatus is placed in any illuminated spot.

The light filter CGHF completely overcomes the drawback mentioned. In fact, upon reaching said light filter CGHF, only a small part of the light following the path OV and VX enters the space B, and it is only this fraction of light that illuminates the objects M and the walls, background and bottom of the space B. But of this fraction of light, upon leaving in the direction BX, only a very small part passes through the light filter CGHF. This very small part of light cannot be seen, as the effect of the bright illumination of space A renders it entirely unnoticeable. This has been proved by experiments.

The relative position between the transparent mirror and the light filter as described in the construction of the apparatus is not absolutely necessary. It is sufficient that the light filter CGHF be placed in the path of the luminous rays going from the space B to the transparent mirror CDEF.

If a gradual change of lights is applied to the apparatus, naturally all the phenomena described above will be gradually produced.

The purpose of the opaque screen KLCF mentioned in explaining the construction of the apparatus, is to prevent the light from passing from A to B or from B to A. Obviously the light passing through the transparent mirror and the light filter may pass from A to B or from B to A, but only in an insignificant amount which does not affect the purpose of the apparatus.

The purpose of the crystals or glasses YZDE and HGDE already mentioned, is to give, due to their symmetry in respect to the plane of the mirror CDEF, the sensation that the bottom YZDE does not change when the space B is illuminated, as in this case, by reflection on said mirror, HGDE is seen as if it were in the place of its image, viz; exactly in YZDE. If no such crystals or glasses are arranged, upon illuminating A and therefore the space CDZFEY, the bottom would be seen in YZDE, and on illuminating B, the hollow or lack of wall at HGDE would be seen in the position of its image, viz; at YZDE, resulting different from when A is illuminated.

What we claim is:—

1. An apparatus for producing optical illusions, characterized in that it comprises, in combination, a transparent mirror interpolated between some first objects and the observer; a light filter interpolated between some second objects and said transparent mirror, both first and second objects being arranged on the opposite faces of said transparent mirror; plates of transparent and diaphanous material arranged at symmetrical angles in respect to the plane of the transparent mirror, one of said plates being applied to all or part of the floor on which said first objects are placed; and means for alternatively illuminating said first and second objects.

2. An apparatus for producing optical illusions, characterized in that it comprises, in combination, a transparent mirror interpolated between some first objects and the observer; a light filter interpolated between some second objects and said transparent mirror, said first and second objects being arranged in symmetrical opposite zones in respect to the plane of said transparent mirror; plates of transparent and diaphanous material arranged at symmetrical angles in respect to the plane of the transparent mirror, one of said plates being applied to all or part of the floor on which said first objects are placed; and means for alternatively illuminating said first and second objects.

3. An apparatus for producing optical illusions, characterized in that it comprises, in combination, a transparent mirror interpolated between some objects and the observer; plates of transparent and diaphanous material arranged at symmetrical angles in respect to the plane of the transparent mirror, one of said plates being applied to all or part of the floor on which said objects are placed; and means for alternatively illuminating one face and the other of the transparent mirror.

FRANCISCO SUÁREZ DE DEZA.
RAMÓN BENITO MANGANA TRABAZO.